Feb. 24, 1931.  H. J. BLOCKI  1,793,991
VEHICLE LIFT
Filed April 13, 1927   3 Sheets-Sheet 1
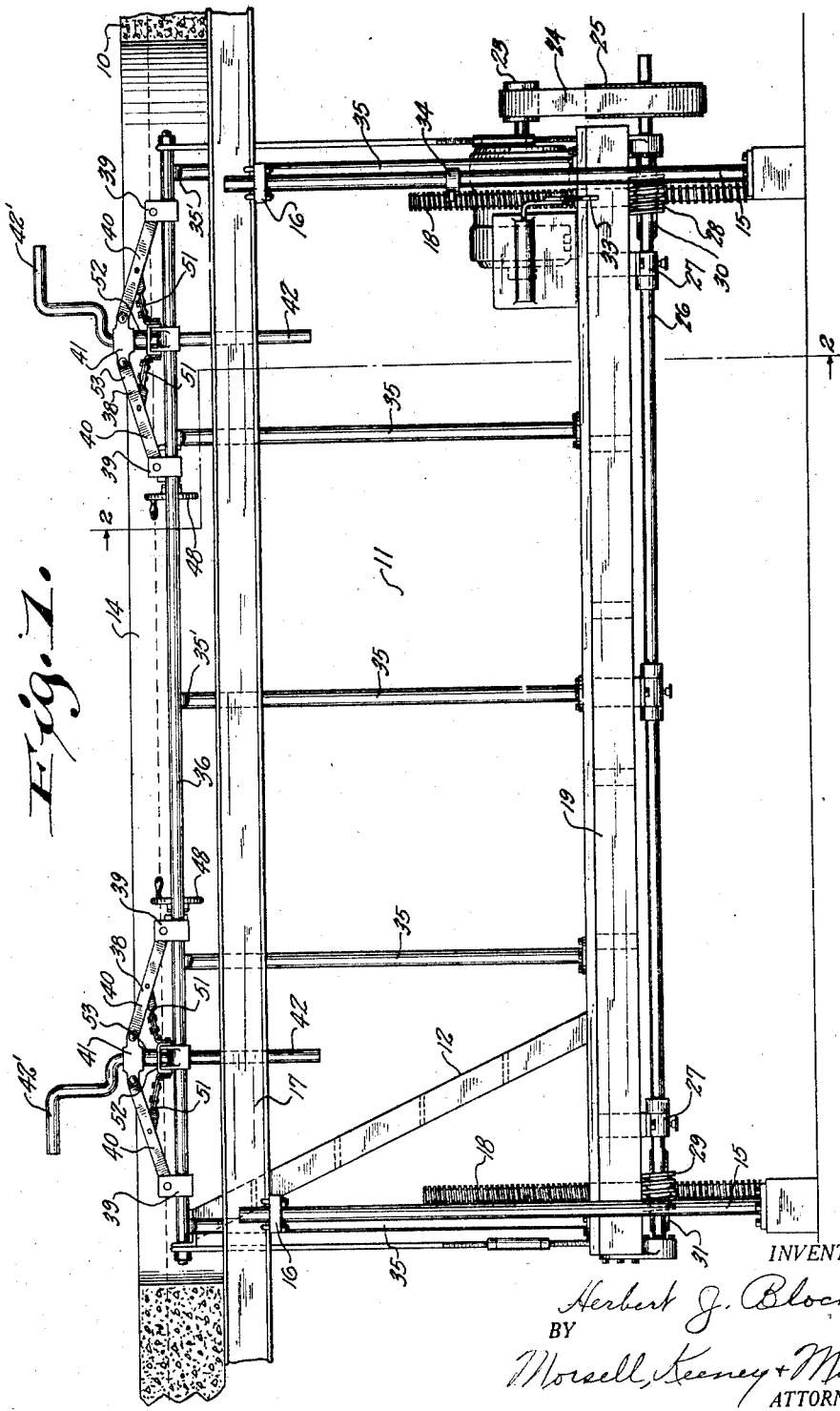

Feb. 24, 1931.  H. J. BLOCKI  1,793,991
VEHICLE LIFT
Filed April 13, 1927   3 Sheets-Sheet 2
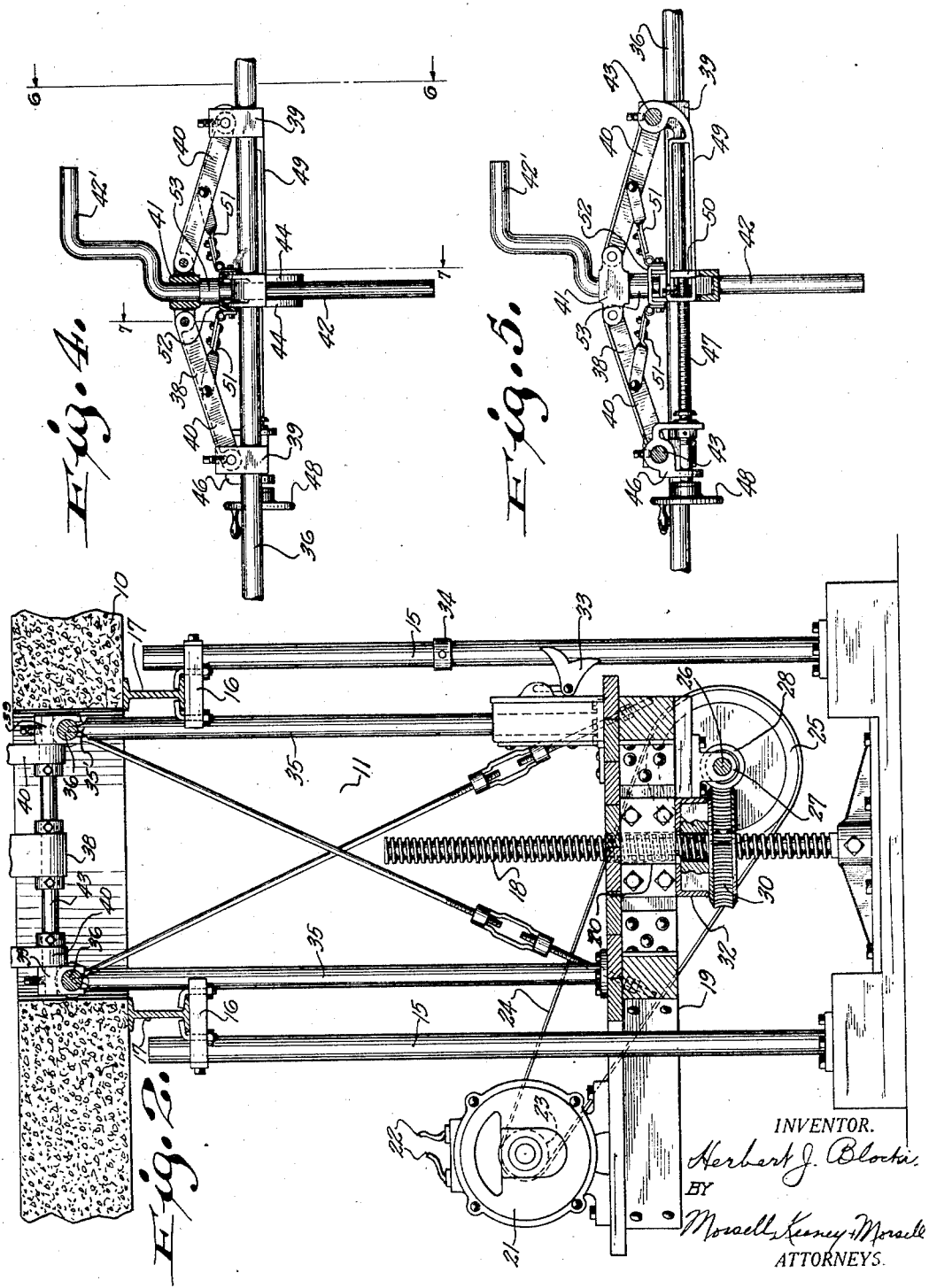
INVENTOR.
Herbert J. Blocki
BY
Morsell, Keeney & Morsell
ATTORNEYS.

Feb. 24, 1931.    H. J. BLOCKI    1,793,991
VEHICLE LIFT
Filed April 13, 1927    3 Sheets-Sheet 3
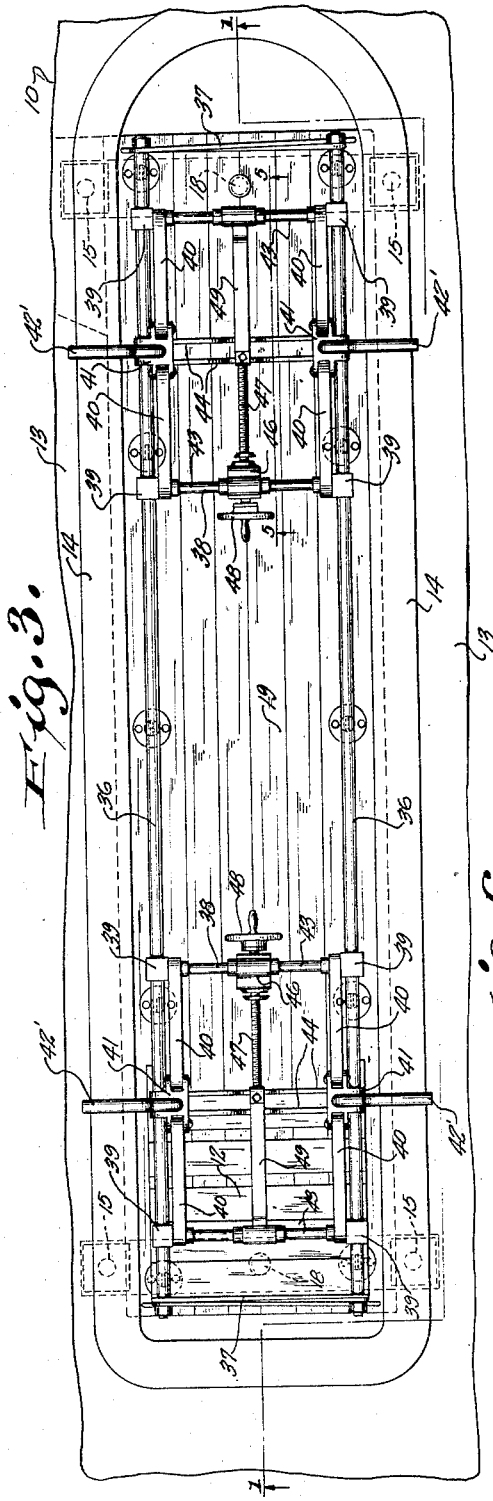
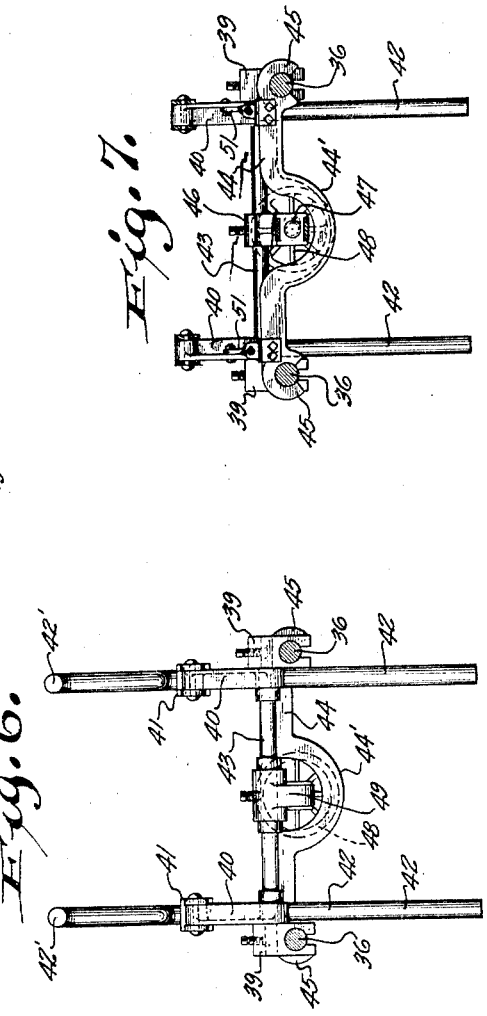
INVENTOR.
Herbert J. Blocki
BY
Morsell, Keeney + Morsell,
ATTORNEYS.

Patented Feb. 24, 1931

1,793,991

UNITED STATES PATENT OFFICE

HERBERT J. BLOCKI, OF SHEBOYGAN, WISCONSIN, ASSIGNOR TO ERIE OIL COMPANY, OF SHEBOYGAN, WISCONSIN, A CORPORATION OF WISCONSIN

VEHICLE LIFT

Application filed April 13, 1927. Serial No. 183,565.

This invention relates to improvements in vehicle lifts, particularly adapted for use in the lubrication and greasing of motor vehicles.

It is the primary object of the present invention to provide a vehicle lift for use in greasing pits and adapted to elevate a vehicle and to take the weight of the vehicle off its wheels and springs to permit the ready and thorough introduction of lubricant into the spring shackles and other normally inaccessible parts.

A further object of the invention is to provide a motor propelled vehicle lift adapted to engage the frame of a vehicle to elevate it to any desired height and off its wheels.

A further object of the invention is to provide a vehicle lift having two elevating mechanisms, one of which is hand operated for fine adjustments.

A further object of the invention is to provide a vehicle lift having four frame engaging members which are swivelingly mounted for movement in order to be brought into proper positions to engage convenient portions of a vehicle frame.

A further object of the invention is to provide a vehicle lift for greasing pits which is of simple construction, is strong and durable, is simple and efficient in operation, and is well adapted for the purposes described.

With the above and other objects in view, the invention consists of the improved vehicle lift, and its parts and combinations as set forth in the claims, and all equivalents thereof.

In the accompanying drawing in which the same reference characters indicate the same parts in all of the views:

Fig. 1 is a section through a greasing pit and showing the vehicle lift in side elevation, the view being indicated on the line 1—1 of Fig. 3;

Fig. 2 is a cross-sectional view taken on line 2—2 of Fig. 1 and on a larger scale;

Fig. 3 is a plan view of a pit with the vehicle lift therein;

Fig. 4 is an enlarged detail view, partly in section of one of the frame engaging members and the means for manually operating the same;

Fig. 5 is a view similar to Fig. 4 taken on line 5—5 of Fig. 3 and on a larger scale;

Fig. 6 is a view taken on line 6—6 of Fig. 4; and

Fig. 7 is a view taken on line 7—7 of Fig. 4.

Referring now more particularly to the drawings, it will appear that the numeral 10 designates a greasing pit such as is found in filling stations, garages and the like. Said pit has the usual depressed pit portion 11 of a depth about equal to a man's height and a stairway 12 at one end affords access to the bottom portion of the pit. The pit, of course, is narrower than the distance between opposite wheels of a vehicle and the upper level portion adjacent the pit opening is formed with tracks 13 defined by inner raised rails 14 and the wheels of a vehicle are intended to run on said tracks 13 to bring the body portion of the vehicle directly over the pit opening.

Secured to the base of the pit at each end thereof are two pairs of tubular vertical supporting standards 15 and the upper portions of said standards have secured thereto brackets 16 to which are fastened longitudinally extending I-beams 17 which form a support for the upper horizontal portions of the pit.

There is also secured to the bottom portion of the pit, at each end thereof and medially of the sides, a vertical screw threaded post 18, and vertically movably mounted on said posts is a horizontal platform 19, the posts extending through openings 20 therethrough. An electric motor 21 is mounted on one side of the platform and at one end thereof and receives energy through circuit wires 22 connected with any convenient source of supply. The drive pulley 23 of said motor is connected by a belt 24 with a large pulley 25 mounted fast on a longitudinally extending shaft 26 which is supported below the platform in bearings 27. The shaft 26, at each end portion, carries fast thereon worms 28 and 29 and said worms are adapted to mesh with worm wheels 30 and 31 which are threadably mounted on the screw threaded posts 18. Thus, when the motor is operated in one direction, the worms 28 and 29 will turn the worm wheels 30 and 31 upwardly on the posts and the upward movement of said worm wheels will raise on the posts a pair of blocks 32, one block being vertically movably mounted on each post and interposed between the worm wheel and the bottom portion of the platform. The upward movement of said blocks will, of course, cause the platform to rise on said posts.

The motor may be controlled by a pivotal dog switch 33, included in the motor circuit, and mounted on the platform. Said switch, upon a predetermined vertical movement of the platform, is adapted to strike a projecting portion of a collar 34, adjustably mounted on and adjacent standard 15, whereby the switch will be thrown off, stopping the motor.

Built up from the platform 19 is a supporting structure including a plurality of vertical members 35 reduced at their upper end portions 35' to receive longitudinal top bars 36. The ends of the bars 36 are connected by transverse members 37.

A pair of elevating carriers, designated generally by the numerals 38, are slidably mounted on the top longitudinal bars 36 and one of said elevating carriages will be described in detail. Each carriage includes four blocks 39, slidably mounted in pairs on the opposite top bars 36. Each block has pivotally connected thereto a link 40 and each pair of links are pivotally connected at their inner end portions to an apertured bearing member 41. A frame engaging arm 42 having an angular upper end portion 42' is pivotally or swivelingly mounted through each bearing member. Opposite blocks 39 are connected together by transverse bars 43 and the opposed bearing members 41 are connected together by pairs of transverse members 44 which are downwardly curved at their mid-portions 44' and which also have their end portions 45 slidably mounted on the longitudinal bars 36. A guide bracket 46 is mounted medially on one of the transverse bars 43 and extended through said guide bracket is an elongated screw rod 47 having a hand wheel 48 at its outer end. The opposite transverse bar 43 has medially mounted thereon the outer end portion of a slotted guide arm 49 and said screw rod 47 extends into the guide arm and has a threaded engagement therewith and a block 50 loosely carried by the end portion of said screw rod is confined within said guide arm but may move longitudinally with respect thereto.

It will also be observed that each link 40 of an adjacent pair are connected by straps 51, each strap being pivotally connected to an intermediate portion of a link and also being hingedly connected at its other end portion to a guide bracket 52 which is slidably mounted on a longitudinal bar 36 and having an off-set portion through which a frame engaging arm 42 extends (see Figs. 4 and 5). A collar 53 is positioned between the guide bracket and the bearing member 41.

The construction and mounting of each elevating carriage is such that when the hand wheel 48 is operated to turn the screw rod 47 in one direction the end transverse bars 43 will be drawn closer together, sliding the blocks 39 on the longitudinal bars 36. This movement of the bars 43 toward each other will cause the angularity or inclination of the links 40 to be increased, thereby raising the bearing members 41 carried thereby and and also lifting the frame engaging arms 42 mounted in said bearing members. Obviously, a reverse operation of the hand wheel will cause a lowering of the frame engaging arms.

In use, a vehicle is driven onto the tracks 13 of the pit so that the body portion of the vehicle will be disposed directly over the pit opening. The pit operator will then descend to the platform 19 which should be at its lowest position and then the motor will be started to raise the platform and supporting structure carried thereby. After the platform has been raised a predetermined distance so that the engaging portions 42' of the arms 42 are quite close to the vehicle frame, the motor will be stopped by operation of the switch which has moved into contact with the lug of the collar 34, the collar having previously been adjusted. The pit operator will then manually operate the elevating carriages 38 to bring both pairs of arms 42 into engagement with the vehicle frame, it being noted that said arms may be swiveled to locate the same under a desired clear portion of the vehicle frame for engagement. The motor may then again be operated to raise the platform and supporting structure a desired distance and the vehicle will be thereby elevated off its wheels a desired distance above the tracks or pit top floor. A vehicle so supported and elevated may be very thoroughly and efficiently greased and lubricated with the additional advantage that the springs are not expanded and may be worked on as well as the shackles. The vehicle may be lowered by reversing the motor to cause the descent of the platform and the collar 34 may be previously dropped a sufficient distance to automatically operate the switch 33 when the platform has dropped sufficiently far.

From the foregoing description it will be seen that the improved vehicle lift is of very simple and novel construction, and is well adapted for the purposes described.

What I claim as my invention is:

1. A vehicle lift, comprising a supporting structure, means for raising and lowering said supporting structure, two pairs of lifting members, the lifting members of each pair being jointly movably carried by said supporting structure, and other means for independently raising and lowering each pair of lifting members, said pairs of lifting members being adjustable longitudinally of the supporting structure toward or away from each other.

2. A vehicle lift, comprising a non-portable supporting structure, means for raising and lowering said supporting structure, a pair of elevating carriage members movably mounted on said supporting structure longitudinally thereof and movable toward and away from each other, and crank means for independently elevating portions of each carriage member with respect to the supporting structure.

3. The combination with a vehicle platform having an opening therein, of a supporting structure vertically movably mounted through the opening of said platform, means for raising and lowering said supporting structure, a pair of elevating carriage members longitudinally movably mounted on said supporting structure at opposite ends thereof, and means for independently elevating portions of each carriage member with respect to the supporting structure.

4. The combination with a vehicle platform having an opening therein, of a supporting structure vertically movably mounted through said platform opening, means for raising and lowering said supporting structure, a pair of elevating carriage members longitudinally movably mounted on said supporting structure, each carriage member having a pair of adjustable vehicle frame engaging arms, and means for independently elevating each carriage member with respect to the supporting structure to raise the arms carried thereby.

5. The combination with a vehicle platform having an opening therein, of a supporting structure, vertically movably mounted through said platform opening, means for raising and lowering said supporting structure, a pair of elevating carriage members longitudinally movably mounted on said supporting structure, a pair of vehicle frame engaging arms projecting upwardly from each carriage member and swivelingly mounted therein, and means for independently elevating each carriage member with respect to the supporting structure to raise the arms carried thereby.

6. The combination with a greasing pit, of a supporting structure vertically movably mounted therein, and vertically and longitudinally movable auxiliary lifting members mounted on the upper portion of the supporting structure and extending above the level of the pit.

7. The combination with a greasing pit, of a supporting structure vertically movably mounted therein, means for elevating said supporting structure with respect to the pit, auxiliary lifting members mounted on the upper portion of the supporting structure and extending above the upper level of the pit, and other means for independently elevating each of said lifting members with respect to the supporting structure.

8. The combination with a greasing pit, of vertical posts mounted therewithin, a platform vertically movably mounted within the pit on said posts, a supporting structure carried by said platform, mechanical means for elevating the platform and supporting structure, a pair of elevating carriage members longitudinally movably mounted on said supporting structure, a pair of vehicle frame engaging arms projecting upwardly from each carriage member and swivelingly mounted therein, and manual means for raising each carriage member and the arms mounted therein.

In testimony whereof, I affix my signature.
HERBERT J. BLOCKI.